Patented Jan. 21, 1947

2,414,601

UNITED STATES PATENT OFFICE 2,414,601

PROCESS FOR PRODUCING TUNGSTEN COMPOUNDS

William Charles Lilliendahl, Mountain Lakes, N. J., assignor to Westinghouse Electric Corporation, East Pittsburgh, Pa., a corporation of Pennsylvania No Drawing. Application November 21, 1941, Serial No. 419,978

5 Claims. (Cl. 23—51)

This invention relates to chemistry and more particularly to inorganic chemistry and to an improved method of preparing substantially pure tungstic oxide ($WO_3$).

One of the objects of the present invention is to provide a method of preparing tungstic oxide ($WO_3$) having a degree of purity adapting the same for use in the preparation of fluorescent tungstate compounds.

Another object is to provide a method for removing iron, manganese, copper, cobalt, nickel, aluminum and magnesium, and especially iron, from an aqueous solution of alkali metal tungstates.

Still another object is to provide a commercially practical method of producing tungstic oxide ($WO_3$) containing not over about .001% of associated metal impurities deleterious to the fluorescent response of tungstate compounds subsequently formed therefrom.

Other objects and advantages will be apparent as the invention is more fully hereinafter disclosed.

In accordance with these objects I have discovered a tungstic oxide ($WO_3$) product containing not over .001% of each of the following metals: Fe, Mn, Cu, Co, Ni, Al and Mg. This may be obtained in an economically practical manner from an alkali metal tungstate solution by adding to the tungstate solution an organic compound known in the art as "oxine" or "8-hydroxyquinoline" in an amount at least in slight excess of that theoretically sufficient to react with all of the associated metal impurities present in the solution, when the solution is maintained at a pH of approximately 9 and the solution temperature is maintained within the range 60–80° C. for an extended time interval adapted to induce complete precipitation of the said associated metals as insoluble organo-metallic compounds of the said "oxine" and agglomeration of the same into a filterable mass. On separating the insoluble organo-metallic precipitate from the alkali tungstate solution, as by filtering, and recovering the tungstic acid content of the filtrate, by any desired method, as for example, by acidifying the filtrate with HCl to the acid pH at which tungstic acid precipitates from the solution, the tungstic acid recovered analyzes not over .001% Fe and not over .001% of each other associated metal impurity.

In the manufacture of fluorescent tungstate compounds, it is known that small amounts of iron and other metal impurities of the group Fe, Mn, Cu, Co and Ni, producing colored anions, and the metals Al and Mg, markedly decrease the fluorescent response of the tungstate compounds. For example, Fe in an amount as low as .001% in calcium tungstate reduces the fluorescent response of the material approximately 6% and Fe in amounts as high as .005% reduces the fluorescent response of the material about 15%. As such luminescent materials are produced by heating tungstic oxide with the oxide of calcium (magnesium or zinc) the purity of the tungstic oxide as well as the purity of the combining oxide are important factors. By the practice of the present invention a tungstic oxide of the high degree of purity required may be obtained consistently at a relatively low cost, as compared with prior art practices.

In accordance with the present invention alkali metal tungstate compounds, previously purified by any of the known prior art practices and containing associated impurities such as Fe, Mn, Cu, Co, Ni, Al and Mg in excess of .001% per element, (based on the tungstic acid content) are further purified and freed of the said associated metal impurities to the extent at least that the said associated metal impurities do not exceed .001% per element (based on the tungstic acid content).

The method of the present invention comprises essentially the following steps:

(1) The forming of an alkali metal tungstate solution having a pH within the range 11 to 12, a concentration of about 200 grams $WO_3$ per liter, and a temperature of about 70° C. (60°–80° C.).

(2) The addition to this solution of a quantity of the reagent "oxine" in slight, preferably 5–10%, excess of the amount theoretically required to react with and precipitate the associated metal impurities present in the solution.

(3) The adjusting of the solution to a pH of about 9.0 and the prolonged digestion at a temperature within the range 60 to 80° C.

(4) Filtration.

(5) Addition of the filtrate to HCl to precipitate the tungsten content thereof as tungstic acid, as heretofore practiced in the art.

(6) Washing and drying of the precipitated tungstic acid content as heretofore practiced in the art.

The alkali metal tungstate solution of step 1 of the above process is preferably formed by dissolving commercially pure $WO_3$ in caustic alkali, using a sufficient excess of the alkali to produce, on dilution to the $WO_3$ concentration desired, the desired pH within the range 11 to 12. The concentration of $WO_3$ in the solution may vary widely without essential departure from the present invention, as one skilled in the art will perceive, depending in part upon the subsequent method of precipitating the $WO_3$ content. I have employed concentrations of $WO_3$ varying within the range 50 to 200 grams of $WO_3$ per liter, but preferably in the range 50–100 gms. $WO_3$ per liter, as at higher concentrations throwing out of NaCl may occur upon addition of HCl in adjusting the pH, where the $WO_3$ content of the solution is subsequently to be precipitated therefrom by adding the purified tungstate solution slowly to a strongly acid solution.

Alternatively, any of the heretofore practiced methods of producing an alkali metal tungstate compound or solution having a purity suitable ordinarily for the production of tungstic oxide for reduction to tungsten metal may be employed, if desired, without essential departure from the present invention.

The "oxine" reagent added in step 2 of the present process, preferably, is prepared by dissolving 10 grams of commercial "oxine" in 20 milliliters of glacial acetic acid and diluting the resulting solution to 200 milliliters with distilled water. The precise amount of this reagent added depends upon the known associated metal content of the solution. There is no disadvantage in employing a large excess of the reagent over that theoretically required except that the cost of the reagent dictates the use of the lesser amount.

Heretofore in the art, the reagent "oxine" has been proposed as a precipitant for the metals Fe, Mn, etc., particularly for use in quantitative chemical analysis and many publications appear in the prior art giving full details and data as to the stoichiometrical quantities to be employed with the various elements. In view thereof, it appears unnecessary to disclose in this specification the stoichiometrical relation of the precipitant to the Fe, Mn, etc., metals for one skilled in the art to practice this particular step of the present invention. I will now describe a detailed example showing the use of my invention.

Eight liters of a solution of potassium tungstate, obtained by digestion of Wolframite ore with potassium hydroxide, containing 200 gms. $WO_3$ and 168 gms. $K_2O$ per liter, was diluted with an equal volume of water, and 200 ml. of a 5 per cent solution of "oxine" added. The solution was acidified with concentrated HCl to a pH of 9.3 using a Beckmann pH meter (glass electrode) apparatus. The metallo-organic precipitate obtained was digested at 70–80° C. for 3 hours. The precipitate was filtered on a Whatman #42 paper and the filtrate concentrated to eight liters by evaporation to bring the $WO_3$ concentration back to 200 gms. per liter. Tungstic acid was precipitated by addition to HCl in the acidity range 25–7%. The tungstic acid was washed by decanation with dilute HCl (25 ml. concentrated HCl per liter), filtered with suction, and dried at 108° C. The dried acid analyzed 0.0007% Fe, 0.0005% Al and 0.0008% Mg.

Eight liters of the original tungstate solution containing 200 gms. $WO_3$ per liter was precipitated in the same manner and the resulting tungstic acid obtained was analyzed and found to contain 0.004% Fe, 0.0016% Al and .0014% Mg.

The concentration of the filtrate, after removal of the "oxine" precipitate mentioned in the detailed example, has no bearing upon the method or the elimination of impurities and was performed to bring the $WO_3$ concentration to a value comparable with the control.

Having hereinabove described the present invention generically and specifically, it is believed apparent that the same may be widely varied without essential departure therefrom and all such modifications and adaptations of the same are contemplated as may fall within the scope of the following claims.

I claim:

1. The method of removing undesirable metallic elements, including iron, from an aqueous solution of an alkali metal tungstate, which comprises heating to a temperature between 60° and 80° C., adjusting the solution to a pH of between 11 and 12, adding 8-hydroxyquinoline thereto in an amount sufficient to react with and precipitate such elements present in the solution, lowering the pH of the solution to between 7 and 10, and digesting the solution for an extended time interval at a temperature between 60° and 80° C., thereby causing said elements to be precipitated therefrom as organo-metallic compounds.

2. The steps in the method of manufacturing tungstate compounds for their fluorescent response, comprising removing the elements iron, manganese, copper, cobalt, nickel, aluminum and magnesium from an aqueous solution of an alkali metal tungstate by heating the solution to a temperature within the range 60–80° C., adjusting the solution to a pH of between 11 and 12, adding 8-hydroxyquinoline thereto in an amount at least sufficient to react with and precipitate the said elements, lowering the pH of the solution to about 9 by the addition of HCl, heating the solution for an extended time interval at a temperature within the range 60–80° C. to insure the precipitation of said elements by said 8-hydroxyquinoline as organo-metallic compounds, and separating the precipitate from the solution.

3. The steps in the method of manufacturing tungstate compounds for their fluorescent response, comprising preparing substantially pure tungstic acid by converting impure tungstic oxide to an alkali metal tungstate, dissolving the said tungstate in water, adding caustic alkali to the solution to a pH of between 11 and 12, heating the solution to between 60–80° C., adding 8-hydroxyquinoline to the solution in an amount at least in slight excess of the amount theoretically sufficient to react with all of the associated metal impurities in the said tungstate solution, including iron, and cause them to precipitate as organo-metallic compounds, lowering the pH of the solution to a pH of about 9.0 by the addition of HCl, heating the solution for an extended time interval at a temperature within the said range 60–80° C., filtering the solution, and acidifying the clear filtrate to precipitate the tungstic acid content thereof.

4. The steps in the method of manufacturing tungstate compounds for their fluorescent response, comprising preparing tungstic acid substantially free of the metals Fe, Mn, Cu, Co, Ni, Al and Mg, by forming an alkali metal tungstate solution, adjusting the solution to a pH of between 11 and 12, heating the solution to a temperature of between 60–80° C., adding 8-hydroxyquinoline to the solution in an amount in slight excess of the amount theoretically necessary to react with all of the said metals present in the solution and cause them to precipitate as organo-metallic compounds, adjusting the solution to a pH of about 9, filtering the solution, and acidifying the filtrate to precipitate the tungstic acid content.

5. The steps in the method of manufacturing tungstate compounds for their fluorescent response, comprising precipitating the metals iron, manganese, copper, cobalt, nickel, aluminum and magnesium, from an alkali metal tungstate solution by heating the solution to a temperature within the range 60–80° C., adjusting the solution to a pH within the range 11 and 12, adding 8-hydroxyquinoline to the solution in an amount at least in slight excess of the amount theoretically required to react with the total amount of said metals present in the said solution, lowering the pH of the solution to a pH of about 9, and digesting the solution for an extended time interval at a temperature within the range 60–80° C. to precipitate the said metals as insoluble organo-metallic compounds.

WILLIAM CHARLES LILLIENDAHL.